(12) United States Patent
Lackey et al.

(10) Patent No.: US 6,918,940 B1
(45) Date of Patent: Jul. 19, 2005

(54) FILTER DEVICE WITH CORNER ATTACHMENT

(75) Inventors: Robert W. Lackey, Hickory, NC (US); Roy Nicholson, Blowing Rock, NC (US)

(73) Assignee: Imagine One, Hickory, NC (US)

(*) Notice: Subject to any disclaimer, the term of this patent is extended or adjusted under 35 U.S.C. 154(b) by 188 days.

(21) Appl. No.: 10/444,943

(22) Filed: May 23, 2003

Related U.S. Application Data

(60) Provisional application No. 60/383,669, filed on May 28, 2002.

(51) Int. Cl.[7] .............................................. B01D 46/10
(52) U.S. Cl. ........................ 55/501; 55/385.1; 55/495; 55/509; 55/DIG. 31
(58) Field of Search ................................ 55/385.1, 493, 55/495, 501, 504, 505, 507, 509, DIG. 31, DIG. 35

(56) References Cited

U.S. PATENT DOCUMENTS

| | | | |
|---|---|---|---|
| 2,050,605 A | * 8/1936 | Gordon et al. ............... 55/493 |
| 2,139,014 A | * 12/1938 | Greig ......................... 55/490 |
| 3,357,763 A | * 12/1967 | Toper .................... 55/DIG. 31 |
| 3,418,794 A | * 12/1968 | Doria ........................... 55/501 |
| 3,774,377 A | * 11/1973 | Bishop ......................... 55/501 |
| 3,823,533 A | * 7/1974 | Alverson et al. ............. 55/501 |
| 4,042,358 A | 8/1977 | Frohmader ................... 55/497 |
| 4,199,387 A | 4/1980 | Hladik ....................... 156/160 |
| 4,519,823 A | * 5/1985 | Kinney et al. ................ 55/509 |
| 4,629,474 A | 12/1986 | Thornton .................... 264/109 |
| 4,689,058 A | * 8/1987 | Vogt et al. .................... 55/501 |
| 4,737,174 A | * 4/1988 | Pontius ................. 55/DIG. 31 |
| 4,999,038 A | * 3/1991 | Lundberg ..................... 55/501 |
| 5,167,740 A | 12/1992 | Michaelis et al. ......... 156/73.1 |
| 5,456,836 A | 10/1995 | Jeffery et al. ............... 210/505 |
| 5,620,505 A | * 4/1997 | Koch et al. ................... 55/509 |

* cited by examiner

Primary Examiner—Duane Smith
Assistant Examiner—Jason M. Greene
(74) Attorney, Agent, or Firm—Charles L. Schwab; Nexsen Pruet, LLC

(57) ABSTRACT

A filter element with a replaceable filtration panel held in place in a frame by elastic straps. A course support screen may be included atone side of the filtration panel.

6 Claims, 2 Drawing Sheets

FILTER DEVICE WITH CORNER ATTACHMENT

REFERENCE TO EARLIER FIELD APPLICATION

The inventor claims the benefit of U.S. provisional patent application No. 60/383,669 entitled Filter Devices filed May 28, 2002.

TECHNICAL FIELD

This invention relates to a filter element for a heating, ventilating and cooling. system generally referred to as a HVAC system.

BACKGROUND OF THE INVENTION

HVAC systems typically have a plurality of return air ducts, each of which is provided with an air inlet covered by a hinged or removable louver or screen. The inlet also includes a frame for supporting a replaceable quadrilateral filter element. The typical replaceable filter element includes a cardboard frame and a fibrous mesh panel or similar filtration material which may be held in place by grids or large mesh screens. Also pleated filter panels have been used in replaceable filter elements.

The filter elements in HVAC systems are replaced periodically in order to insure effective filtration of air. Replacement of the filter elements several times a year results in a considerable expense to occupants and owners of buildings.

Heretofore a variety of fluid filters have been heretofore been proposed. Pleated air filters are disclosed in a U.S. Pat. No. 4,199,387 issued Apr. 22, 1980 to S. M. Hladik for an Air Filter Fabrication Method, in U.S. Pat. No. 4,042,358 issued Aug. 16, 1977 to S. H. Frohmader for a Filter Media and in U.S. Pat. No. 5,167,740 issued Dec. 1, 1992 to U. Michaelis et al. for a Method of Making a Filter Element Insert of Nonwoven Material in the Form of a Pleated Pack. Filter elements for liquids are disclosed in U.S. Pat. No. 4,629,474 issued to D. I. Thornton for a Thermally Formed Filter and in U.S. Pat. No. 5,456,836 issued Oct. 10, 1995 to A. B. Jeffery et al. for a High Efficiency, Self-Supporting Filter Element Make From Fibers.

SUMMARY OF THE INVENTION

It is an object of this invention to reduce the cost of replacing filter elements in a HVAC system. It is a further object of this invention to permit easy replacement of the filtration material of a filter element. The filter element includes a quadrilateral frame, a filtration panel in the frame, a course grid in the frame at one side of the filtration panel and an elastic strap across each of the four corners of the frame at the other side of the filtration panel.

BRIEF DESCRIPTION OF THE DRAWINGS

One embodiment of the invention is illustrated in the accompanying drawings, in which.

DETAILED DESCRIPTION OF THE INVENTION

Figure 1:
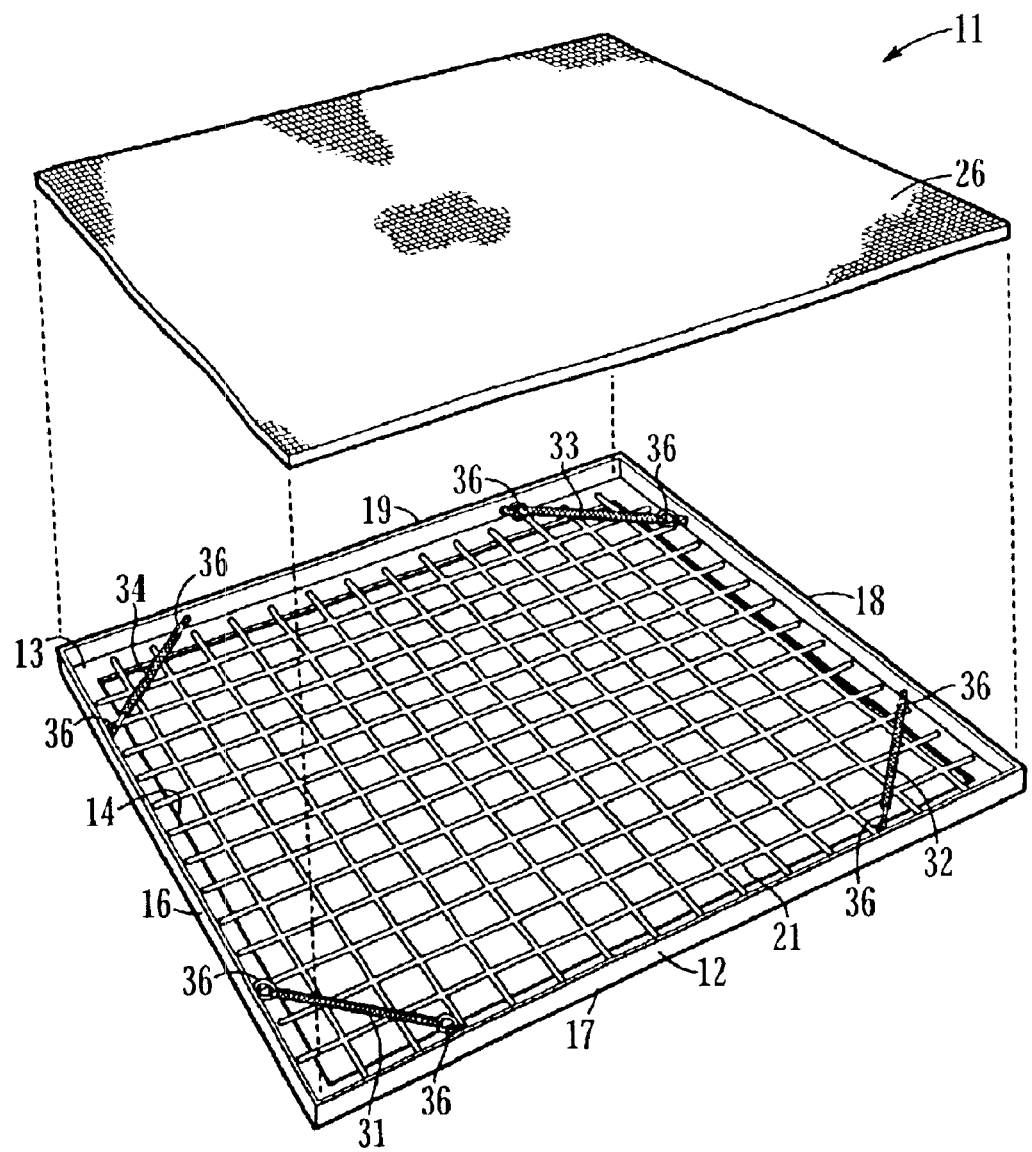
FIG. 1 is an exploded view of a filter element
Figure 2:
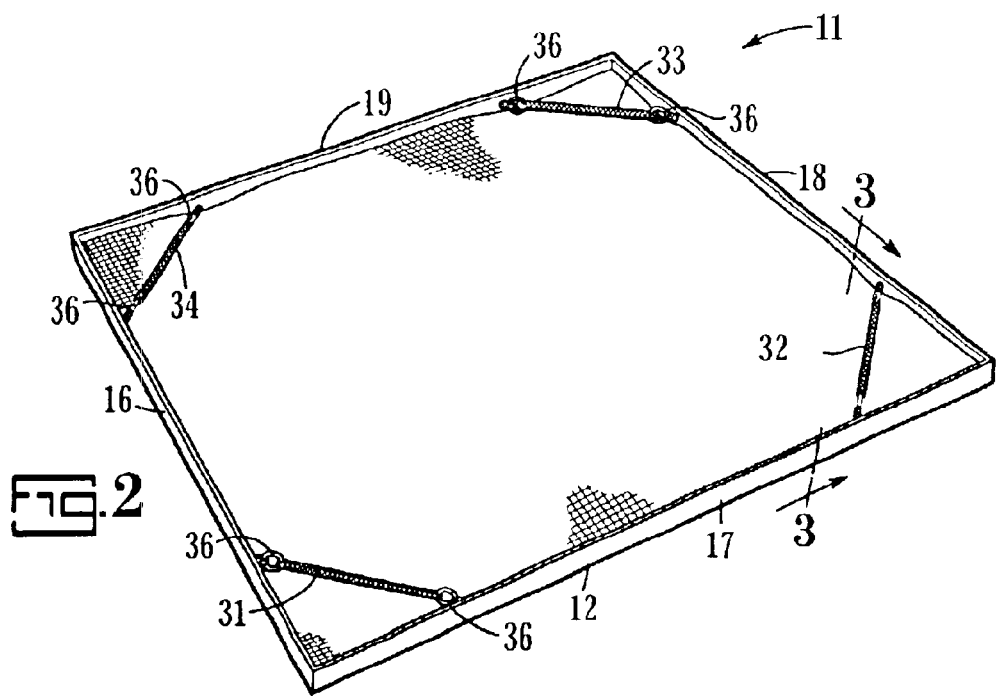
FIG. 2 is a perspective view of the filter element.
Figure 3:
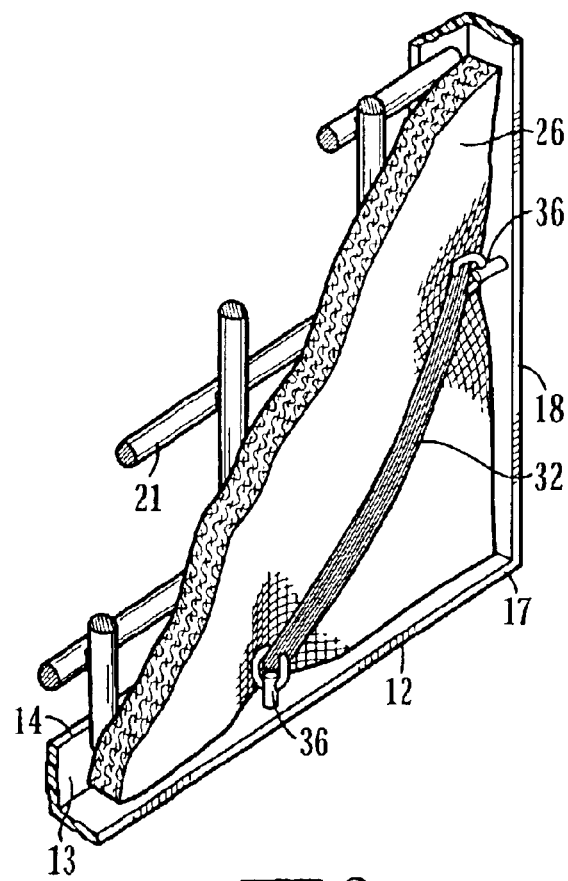
FIG. 3 is a section view taken along line 3—3 in FIG. 2.

Referring to FIGS. 1–3, a filter element 11 includes a quadrilateral frame 12 formed of four L section sides which produces a flat rim 13 with a quadrilateral window 14 and four side walls 16, 17, 18 19 secured to the four outer edges of the rim 13. The four side walls 16, 17, 18, 19 extend perpendicular to the outer edges of the flat rim 13 and form four box-like corners therewith. The window 14 is covered by a course grid 21 with large openings and rests on the rim 13 at the inner side of the walls 16, 17 18 19. The course grid 21 serves as a support for one side of a flat removable filtration panel 26 made of pliant fibrous material. The filtration panel 26 is held in place in the frame 12 by four elastic retention straps 31, 32, 33, 34 extending diagonally across the four corners of the frame 12 with ends secured, as by fasteners 36, to the side walls 16, 17, 18, 19 of the frame 12. The frame 12 may be made of a aluminum cardboard, stiff fibrous material or plastic and the grid 21 is preferable made of a relatively stiff plastic.

FIG. 2 shows the filtration panel 26 held in place in the frame 12 against the grid 21 by the straps 31, 32, 33, 34. The grid 21 may also be held in place in the frame 12 by the straps or it may be fastened to the rim 13 by a suitable adhesive. The frame 12 and the grid 21 may be made of a plastic and the grid 21 may be secured to the frame 12 by fusion. When positioned the filter element 11 is installed in the inlet of the air return duct, not shown, of a HVAC system, the filtration panel 26 is on the air intake side of the grid 21 and the return air tends to hold the filtration panel 26 against the grid 21. Thus the upstream side of the filtration panel 26 requires no additional support other than the corner straps 31, 32, 33, 34 which releasably hold the filtration panel 26 within the frame 12. When installed, the four edges of the filtration panel 26 are in juxtaposed relation to the walls 16, 17, 18, 19.

The useful like of filter element 11 of this invention is renewed by merely replacing the filtration panel 26 rather than the entire filter element 11. This results in a substantial saving. For instance, by purchasing a roll of 20 inch wide filtration panel material a homeowner can cut the common size 20 inch by 20 inch panels and the common size 20 by 30 inch panels and easily replace panels that periodically need replacing.

When renewing a filter element the homeowner removes the usual air return cover, not shown, from the return air opening of the return air duct and removes the filter element 11. Next the filtration panel 26 is removed and a replacement filtration panel, cut to proper size, is installed. Then the filter element 11 is installed in the return air opening and the cover is replaced. Only the filtration panel is discarded. Heretofore the entire filter element, that is the frame and filtration panel, was discarded. Thus by using this invention the homeowner saves money and considerably less refuse is placed in landfill depositories for waste.

What is claimed is:

1. A filter clement for a return air opening of a heating, ventilating and cooling system comprising:

a quadrilateral frame formed of L section sides, said L-section sides frame having four upstanding walls and a flat rim extending inwardly from said walls terminating in edges defining a quadrilateral window through which return air flows, said rim and adjoining walls defining four box like corners, a grid covering said window and an elastic strap extending diagonally across each of said box like corners and secured at its opposite ends to said frame, said elastic straps being operable to hold a quadrilateral filtration panel shaped to fit wall to wall within said frame.

2. The filter element of claim 1 wherein said opposite ends of said straps are secured, respectively, to adjoining walls of said frame.

3. The filter clement of claim 1 wherein said grid is disposed within said walls of said frame.

4. The filter element of claim 3 wherein said opposite ends of said straps are secured to adjoining walls of said frame.

5. The filter element of claim 4 wherein said grid is supported by said rim.

6. A filter element comprising:
   a quadrilateral frame having
      a flat rim with a quadrilateral shaped window and four outer edges and
      four side walls secured, respectively to the four edges and extending perpendicular thereto, said rim and walls forming four box like corners,
   a course grid secured to said frame in covering relation to said window,
   an elastic retention strap extending diagonally across each of said corners and secured at its opposite ends to said frame and
   a quadrilateral filtration element held in said frame by said retention straps, and having four edges in juxtaposed relation to said four walls, respectively, said filtration element being in covering relation to said window and said grid.

* * * * *